(Model.)
J. WOOD.
SPOON HOOK.
No. 394,632. Patented Dec. 18, 1888.
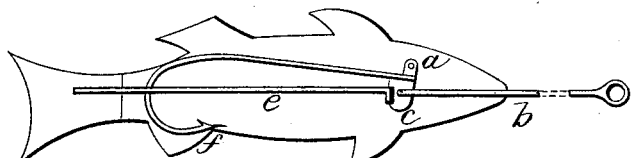
Fig. 1.
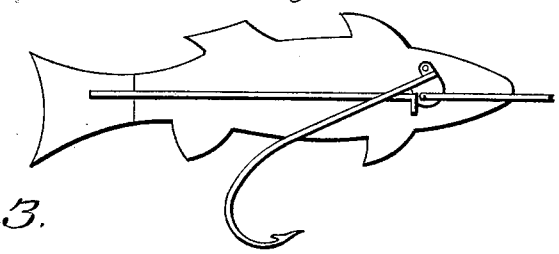
Fig. 2.
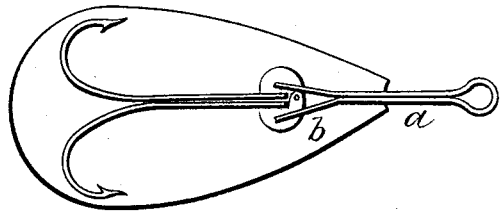
Fig. 3.
Fig. 4.  Fig. 5.
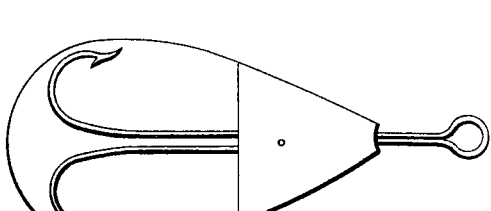
Witnesses.
J. W. Johnson
N. Frank Chandler
Inventor.
James Wood

UNITED STATES PATENT OFFICE.

JAMES WOOD, OF ROCHESTER, NEW YORK.

SPOON-HOOK.

SPECIFICATION forming part of Letters Patent No. 394,632, dated December 18, 1888.

Application filed June 4, 1888. Serial No. 276,044. (Model.)

*To all whom it may concern:*

Be it known that I, JAMES WOOD, a citizen of the United States, residing at Rochester, in the county of Monroe, State of New York, have invented a new and useful Improvement in Fish-Spoons and Fish-Bait, of which the following is a specification.

Heretofore fishing, trolling, and whipping with spoons and spoon-hooks or fish-bait of any kind has been done with great inconvenience and trouble and with poor results by reason of the fact that the hooks, always more or less exposed, were continually catching in the weeds, and at times, by reason thereof, compelling a complete cessation of the sport.

My invention relates to improvements for fish-spoons and fish-bait in which the hooks are concealed to be used in trolling, whipping, and fishing in any manner, in any and all waters, and especially in waters in which weeds are abundant.

The objects of my invention are, first, to provide fish-bait and fish-spoons with concealed hooks to be used among weeds and of such a construction that the said spoons and fish-bait will be absolutely and entirely free from catching weeds or being caught by weeds in any way; second, that the said concealed hooks will become exposed and spring into use only when the spoons and fish-bait are caught by the fish. I attain these objects by the mechanism illustrated in the accompanying drawings.

Figure 1 represents a phantom or imitation minnow, showing the position of the different parts of the attachment when the hooks are concealed. Fig. 2 is a similar view showing the position of the different parts of the attachment when the hooks are exposed. Fig. 3 represents a spoon with the attachment, showing the position of the different parts when the hooks are concealed. Fig. 4 is a similar view as Fig. 3, showing the position of the different parts when the hooks are exposed. Fig. 5 shows a spoon with the attachment, showing the manner in which the attachment is covered and protected.

In Fig. 1, *b* is the draw to which the swivel is attached. The hook is fastened firmly to a flat piece of brass or other suitable material, and this brass or other material is fastened to the draw by the pivot *c*, which allows a free revolving motion at *C*. A portion of this flat material projects on the other side of the hook, and the whole is held in position by the pivot *a*, which is put through the smaller side of the flat material and is firmly attached to the side of the fish. At this point also there is allowed a free revolving motion of the hook and piece of material.

E is a spring, made of brass or any suitable material, and is attached to the piece of flat material directly in front of the pivot *c*, and the other end of the spring is firmly fastened to the fish near the tail.

When the fish or bait is caught and firmly held, the draw *b* pulls the hook and attached material at *c*, and the whole revolves on the pivot *a*, the hooks thereby being forced through the slot or opening *f*, (shown in Fig. 1,) thus becoming exposed, as shown in Fig. 2. When the pressure or strain is relieved, the spring E carries the hooks back to the original and concealed position, as shown in Fig. 1.

The method of using the concealed hooks in spoons is shown in Figs. 3 and 4. To each hook is firmly fastened a piece of flat brass or other suitable metal, as shown in Fig. 3. The hooks with attached material are held in position by the pivot *b*, which passes through the pieces of flat brass or other material used in such a manner that they easily revolve around the pivot *b*. The ends of the draw *a*, which also acts as a spring, are attached to the pieces of flat brass or other material used at either side of the pivot *b*. When the spoon is caught and firmly held, the draw *a*, drawn from the spoon, spreads and thus forces the hooks beyond the sides of the spoon, causing the hooks to become exposed, as shown in Fig. 4. When the pressure or strain is relieved, the draw *a*, receding into the spoon, carries the hooks back to the original and concealed position, as shown in Fig. 3.

Fig. 5 shows the spoon with cap placed over the attachment for the purpose of covering and protecting it.

Having thus fully described my invention, what I claim as new, and desire to secure by Letters Patent, is—

1. An artificial bait having a concealed hook rigidly secured at its upper or shank end to a lever, a draw-rod pivotally attached to one end of the lever, the opposite end thereof being pivoted to the artificial bait, whereby when the rod is drawn upon the hook is vibrated, and a spring engaging the lever to return the hook to normal position when the strain ceases, substantially as and for the purposes set forth.

2. A spoon-bait having concealed hooks rigidly secured at their upper or shank ends to levers, a draw-rod pivotally attached to the ends of each lever, the opposite ends thereof being pivoted to the spoon-bait, whereby when the rod is drawn upon the hooks are vibrated, and a spring engaging the lever to return the hooks to normal position when the strain ceases, substantially as and for the purposes set forth.

JAMES WOOD.

Witnesses:
DANIEL W. JOHNSON,
W. FRANK CHANDLER.